April 12, 1949.  E. BOBARD  2,467,249
FLUID PRESSURE OPERATED CONTROL MEANS
Filed March 17, 1945
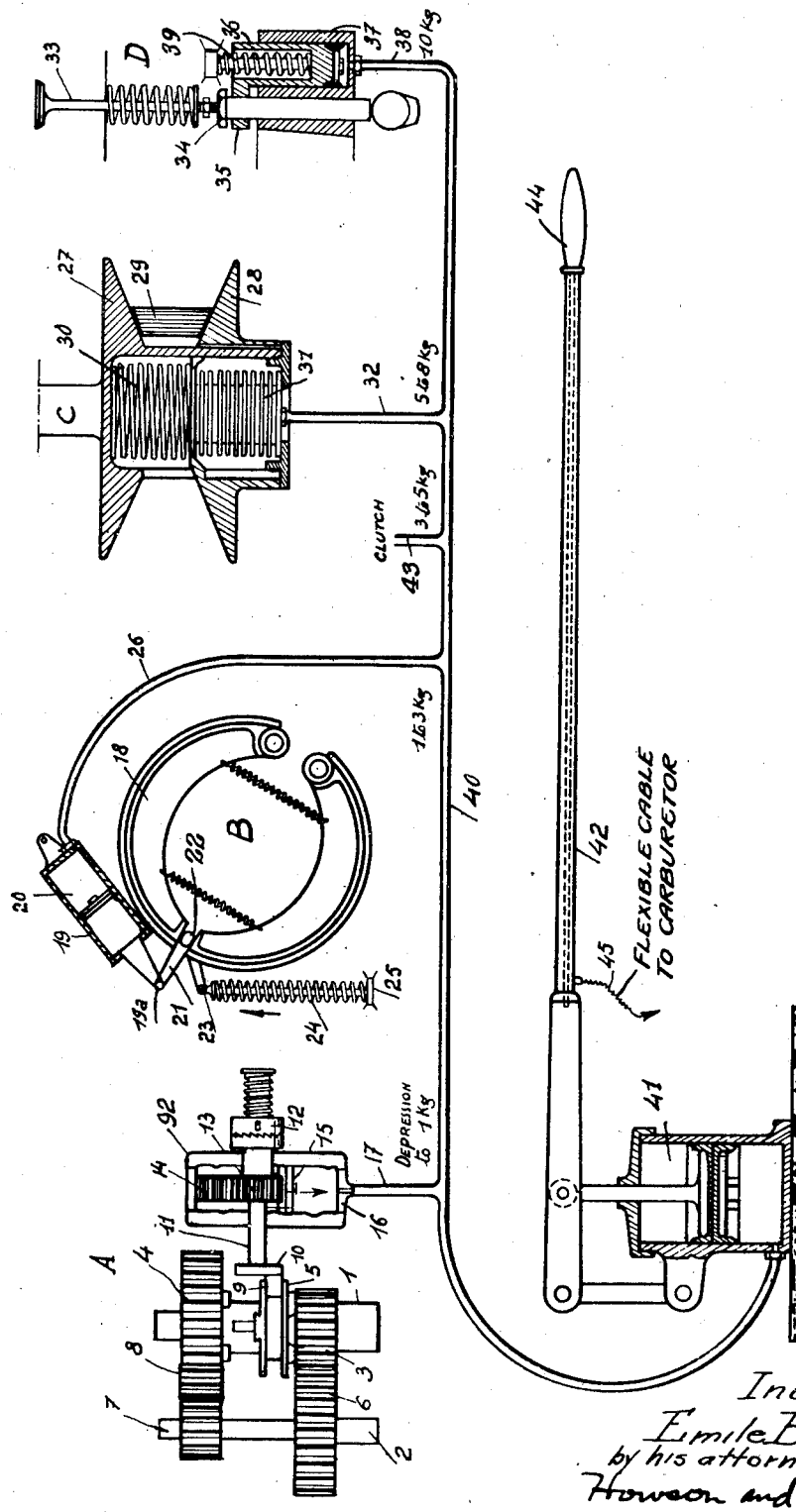
Inventor
Emile Bobard
by his attorneys
Howson and Howson Patented Apr. 12, 1949

2,467,249

UNITED STATES PATENT OFFICE 2,467,249

FLUID PRESSURE OPERATED CONTROL MEANS

Emile Bobard, Beaune, France

Application March 17, 1945, Serial No. 583,306
In France June 3, 1942

Section 1, Public Law 690, August 8, 1946
Patent expires June 3, 1962

2 Claims. (Cl. 123—179)

The object of the invention is a device for controlling the various units of a complex mechanism by means of a single member acting pneumatically or hydraulically.

In certain types of vehicles equipped with internal combustion engines, in particular in vehicles equipped with engines positioned inside one or several of its wheels, it is advantageous to simplify the control means and desirable to actuate the various units controlled in a well defined imperative order, namely, in particular:

Reversing,
Releasing a brake which is automatically locked when the vehicle is stopped.
Disengaging the clutch,
Changing the speed,
Reducing the compression in the cylinders.

It has already been proposed to control several units of a complex mechanical assembly by means of a single member acting either pneumatically or hydraulically. But, in these known systems, the actuating fluid operates simultaneously under the same conditions on the various units controlled and it is no longer possible to regulate accurately the successive order of operation of said units.

In conformity with the invention, on the contrary, the various units controlled are each coupled to an individual pneumatic or hydraulic receiver, said various receiving members are designed so as to operate when the pressure they receive is comprised between two definite limits, the upper limit of operation of any one of said members being equal at most to the lower limit of operation of the next unit.

As said various receiving members are connected to one and the same duct fed by the common control member, it will readily be seen that by acting on said common control member to increase or diminish gradually the value of the pressure or of the partial vacuum in the duct, the various receiving members and the different units to which each one of them is coupled will automatically operate at the required moment without the operator having to take any action other than operating continuously a single control hand-lever in the same direction.

In the particular case of the control of the various members of a power unit, the invention likewise relates to the special arrangement of the various controlled members with a view to their pneumatic and hydraulic operation.

The attached drawing shows diagrammatically as an example, a particular embodiment of the invention in the case of an engine accommodated inside the wheel of a vehicle.

It has been assumed that the arrangement considered is incorporated in an internal combustion engine mounted inside the wheel of a vehicle, wherein the change-speed gear C, brake B and reversing gear A form an integral part of the engine, and which is moreover provided with a decompressor D operating through the valve-lift.

The reversing gear A is adapted for operation while the vehicle is stopped before its being put into motion; the brake B is arranged so as to operate automatically during stoppages and to be released, on the contrary by positive actuation; the change-speed gear C is of the known trapezoidal belt and variable-diameter cone-pulley type, variable diameters being obtained by moving the pulley flanges apart, one only of said flanges being positively controlled.

The compressor D is adapted to facilitate the starting of the engine by reducing its passive resistance, more especially in the case when, the vehicle being equipped with a number of engines positioned in the different wheels, only one of them is cranked by hand, the others being started automatically by the forward movement of the vehicle.

In conformity with the invention, the various units A, B, C, D, are controlled from a distance by pneumatic or hydraulic means and, for instance, are each constituted as follows:

The reversing-gear unit is intended to transmit the motion of the drive shaft 1 either in the same direction as, or in the opposite direction to, a shaft 2 driving the road wheel through suitable reduction gears which are not shown. For this purpose two loose spur-gears 3 and 4 are mounted on said shaft 1 and are capable of rotating in unison with it through the agency of a sliding ratchet 5.

The spur-gear 3 engages directly a spur-gear 6 solid with shaft 2, while spur-gear 4 engages a second spur-gear 7 solid with shaft 2 through a reverse spur-gear 8. Of course, the diameters of said different spur-gears may be designed so as to ensure identical or different reduction ratios for forward and reverse motion.

Control of the reversing sliding ratchet 5 is obtained hydraulically by the following means:

The crank-pin 9 of a crank 10, the axis of which is coupled to a spur-wheel 13 by means of a free-wheel ratchet 12, engages the groove of the ratchet 5. Said spur-wheel 13 meshes with a rack 14 connected with a piston body 15 moving within a cylinder 16 into which a pipe 17 opens so as to constitute the individually controlled member of apparatus A.

Operation is as follows: it being assumed that ratchet 5 is in engagement with spur-gear 3 as shown in the drawing, a partial vacuum in pipe 17 (set up by the device which is to be described hereinunder) causes a movement of piston 15 in the direction of the arrow until said piston comes into contact with the bottom of the cylinder; said longitudinal travel is converted through rack 14 and spur-gear 13 into a rotation of shaft 11 through half a revolution so as to bring ratchet 5 into engagement with the reverse motion spur-gear 4. The interruption of the partial vacuum causes the return of the piston into the position shown in the drawing but said return causes no rotation of shaft 11 owing to the presence of ratchet 12. It will at once be seen that by setting up a further depression at the desired moment, a further half-turn revolution of shaft 11 will be caused, causing the return of the ratchet 5 to the position shown.

Brake B, as is usual, comprises two jaws 18 working in conjunction with a drum (not shown) which is solid with the wheels to which the brake is to be applied.

The operation of the jaws 18 is effected by a piston 19 moving within a cylinder 20 and constituting the controlled member of the brake, the piston-rod being coupled at point 19a with a lever 21 mounted solid with a shaft carrying a cam 22. On said shaft is also rigidly mounted a lever 23 to which is anchored one end of a compression spring 24 the thrust of which is taken up at point 25; said spring tends constantly to cause lever 23 to rotate in the direction of the arrow, and to open the jaws to press them against the drum through the action of the cam 22 solid with the shaft, that is to say the spring 24 tends constantly to apply the brake which is released only by the pressure in cylinder 20, the establishment of pressure in cylinder 20 in communication with pipe 26 being itself produced by the mechanism which is to be hereinbelow described.

As already stated, the change-speed gear C is of the known variable-diameter pulley type. The drawing shows only the driving pulley constituted by two cheeks 27 and 28, one fixed and the other movable, working in conjunction with a trapezoidal section belt 29, and constantly tending to move apart under the action of a spring 30. The drawing nearer of the two cheeks which tends to increase the diameter of the pulley is effected by an extensible wall chamber 31 into which enters a fluid conducting pipe 32 and which constitutes the driven hydraulic member of the change-speed gear.

Decompressor D operates by raising the valves, exhaust valve 33 for instance. For this purpose its push rod 34 can be raised by a lug 35 solid with a piston 36 moving in a cylinder 37 connected with a duct 38 within which a suitable pressure is brought into action, said cylinder constituting the hydraulically driven member of the decompressor.

In order, as will be seen hereinafter, that said cylinder shall only function when a certain determined pressure exists in cylinder 37, a spring 39 has been provided which opposes the movement of piston 36 so long as said pressure has not been reached.

In conformity to the invention, all the receiving members coupled to the various units A, B, C, D, which have just been described, are controlled by a single member and according to a predetermined order, that is to say respectively and successively depending upon the change in pressure caused by a single pump. For that purpose, pipes 17, 26, 32 and 38 feeding units A, B, C, D, are connected to a common duct 40 leading to an oil pump 41 of the usual type, making it possible, by operating its control handle 42 in one direction or the other, to obtain either an increase or decrease in pressure.

Operation is as follows: when idle, pump 41 is in the zero position for which duct 40 is at atmospheric pressure. If it is desired, immediately on starting, to reverse the direction of travel from that in which the vehicle was moving when it was stopped, pump 40 is operated in the direction which causes a partial vacuum in cylinder 16. The result of this is the reversing of the direction of travel, as desired, by the device described. The zero position is at once resumed and it is possible to commence starting. For this purpose the oil pressure in the oil pump is increased. Until the pressure has reached a value of 3 pounds per square inch for instance, the change-speed gear and the decompressor cannot operate on account of the greater resistance offered by springs 30 and 39, for the change-speed gear and the decompressor. Cylinder 20 of the brake, which is gradually released, is alone operated. When said pressure of 3 pounds per inch is reached, the brake should be completely released and the change-speed gear can begin to operate; in practice it will begin to operate at a slightly higher pressure, 5 pounds per square inch for instance, and will have reached the top gear position, the driving pulley will be of its greatest diameter at a pressure of about 8 pounds per square inch. The engine will then be in the most favourable conditions for being started by the forward movement of the vehicle, and the decompressor should be operated; said operation will occur, in practice, at a pressure of about 10 pounds per square inch. Moreover, of course, said movements need by no means be effected stage by stage in actual practice, and the driver may, with his oil pump, raise the pressure suddenly from zero to 10 pounds per square inch.

It should be noted that this principle of the single control of the various accessories of the engine can likewise be utilized for the control of the clutch which, instead of being automatic, would then be contrived in such a manner as to be operated between the period of the releasing of the brakes and the period of changing speed, that is to say it would be provided with a control cylinder communicating through a tube 43 with duct 40 and operating at an intermediary pressure (3 to 5 pounds per square inch in the example shown) situated between the pressure causing the release of the brake and that causing the beginning of the speed variation.

It should be noted finally that, in order to simplify manipulation, the control of the gases supplied to the engine may be ensured through the rotation of handle 44 of pump-arm 42. In the drawing, a flexible shaft 45 leading from said handle to the carburetor has been shown diagrammatically.

It will be understood that the invention is applicable to mechanisms of all types, whether adapted to vehicles or not; the units controlled and the order in which they are controlled may, themselves, differ considerably according to the types of transmitting mechanisms and their applications, the case which has been more particularly described being merely given as an example.

What I claim is:

1. In combination with an internal combustion engine, a fluid controlled system for operating successively the various units acting for the starting of a vehicle comprising a plurality of pressure-responsive elements adapted to operate corresponding units as soon as the pressure in the element has reached a predetermined value, fluid piping feeding each pressure-responsive element, and control means for producing a common variation in pressure in said pipings to either side of atmospheric pressure successively to cover the range of pressures corresponding to the different pressure-responsive elements.

2. In combination with an internal combustion engine of a vehicle a fluid-controlled system for operating the carburetter of the engine and successively the various units acting for the starting of the vehicle, at least one pressure-responsive element adapted to produce a predetermined operation in the corresponding unit as soon as the pressure in the element has reached a corresponding predetermined value, a fluid piping feeding each pressure-responsive element and a member controlling simultaneously the pressure in the different pipings, said member being actuated by an oscillating arm provided with a rotating handle controlling the carburetter of the engine.

EMILE BOBARD.

REFERENCES CITED

The following references are of record in the file of this patent:

UNITED STATES PATENTS

| Number | Name | Date |
| --- | --- | --- |
| 941,426 | Loudon | Nov. 30, 1909 |
| 1,913,268 | De Loach | June 6, 1933 |
| 1,940,469 | Taylor | Dec. 19, 1933 |
| 2,278,713 | Riddle | Apr. 7, 1942 |
| 2,314,165 | Scott-Paine et al. | Mar. 16, 1943 |